(12) United States Patent
Daos et al.

(10) Patent No.: US 7,661,142 B2
(45) Date of Patent: Feb. 9, 2010

(54) SYSTEM AND METHOD FOR TRACKING FEATURE USAGE IN A DOCUMENT PROCESSING ENVIRONMENT

(75) Inventors: Brenda Daos, Mission Viejo, CA (US); Vincent Wu, Irvine, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 650 days.

(21) Appl. No.: 10/995,611

(22) Filed: Nov. 22, 2004

(65) Prior Publication Data
US 2006/0112432 A1 May 25, 2006

(51) Int. Cl.
*G06F 7/04* (2006.01)
(52) U.S. Cl. .................................................. 726/26
(58) Field of Classification Search ............. None
See application file for complete search history.

(56) References Cited

U.S. PATENT DOCUMENTS

| | | | |
|---|---|---|---|
| 5,146,344 A * | 9/1992 | Bennett et al. ............. 358/296 |
| 5,675,510 A | 10/1997 | Coffey et al. |
| 5,870,089 A * | 2/1999 | Fabbio et al. ................ 715/733 |
| 5,878,384 A | 3/1999 | Johnson et al. |
| 5,909,493 A | 6/1999 | Motoyama |
| 5,956,698 A * | 9/1999 | Lacheze et al. ............... 705/34 |
| 6,018,619 A | 1/2000 | Allard et al. |
| 6,366,298 B1 | 4/2002 | Haitsuka et al. |
| 6,662,225 B1 | 12/2003 | Motoyama et al. |
| 6,785,711 B1* | 8/2004 | Motoyama et al. .......... 709/206 |
| 7,216,360 B2* | 5/2007 | Nakao et al. .................... 726/7 |
| 2002/0083003 A1 | 6/2002 | Halliday et al. |
| 2002/0118220 A1 | 8/2002 | Lui et al. |
| 2004/0107387 A1 | 6/2004 | Larsson et al. |
| 2004/0168079 A1* | 8/2004 | Motoyama et al. .......... 713/200 |
| 2004/0181516 A1* | 9/2004 | Ellwanger et al. .............. 707/3 |

\* cited by examiner

*Primary Examiner*—Kambiz Zand
*Assistant Examiner*—Amare Tabor
(74) *Attorney, Agent, or Firm*—Tucker Ellis & West LLP

(57) ABSTRACT

This invention is directed to a system and method for tracing and monitoring feature usage in a document processing environment. More particularly, this invention is directed to a system and method for tracking and monitoring the use of features, services, or functions available to users on document processing devices. The usage information is provided to an administrator or other authorized user in a format that is easily readable and usable.

15 Claims, 5 Drawing Sheets

SYSTEM AND METHOD FOR TRACKING FEATURE USAGE IN A DOCUMENT PROCESSING ENVIRONMENT

BACKGROUND OF THE INVENTION

This invention is directed to a system and method for tracking feature usage in a document processing environment. More particularly, this invention is directed to a system and method for tracking and monitoring the use of features, services, or functions available to users on document processing devices.

Document processing devices, such as multifunctional peripheral devices, typically have a variety of functions or features offered to users. The functions include, but are not limited to, printing, scanning, faxing, finishing options, resolution options, security options, and notification options. There is currently not an efficient and effective mechanism to track the frequency that these features are used, in what document processing operations or environments the features are used, or by what types of users the features are used. Therefore, it is difficult to determine which features are being used and how such features are being used. As future features or enhancements to document process devices are contemplated, it would be beneficial to have such feature usage information. For example, those features which are most often used in one environment, would be included in document processing devices used in such environments, whereas those features not used in those environments would not be included. In addition, those features that are used most often would likely be the ones in which the most enhancements are considered or implemented.

It would be advantages to have a system and method which overcomes the aforementioned problems and provides a mechanism for tracking feature usage in a document processing environment.

SUMMARY OF THE INVENTION

In accordance with the present invention, there is provided a system and method for tracking feature usage in a document processing environment.

Further, in accordance with the present invention, there is provided a system and method for tracking and monitoring the use of features, services, or functions available to users on document processing devices.

Still further, in accordance with the present invention, there is provided a system and method which tracks usage information for features available on document processing devices which is easily readable and usable.

Still further, in accordance with the present invention, there is provided a system for tracking feature usage in a document processing environment. The system comprises monitoring means adapted for securing usage information relating to each of a plurality of document processing operations, which usage information is representative of at least one of frequency and duration and means adapted for selectively communicating the usage information so as to be available to an associated administrator.

In a preferred embodiment, the system further comprises means adapted for receiving a monitor select signal and means adapted for selectively enabling and disabling the monitoring means in accordance with the monitor select signal. Preferably, the system also comprises reset means adapted for selectively resetting the usage information to a selected default value.

In another embodiment, the system further includes a report generator. The report generator includes means adapted for receiving the usage information, formatting means adapted for formatting the usage information into administration data in accordance with a predefined report structure, and means adapted for communicating the administration data to the associated administrator. The administration data is preferably communicated to the to the associated administrator via at least one of an electronic mail message, an Internet web page, or a hard copy.

Preferably, the system also comprises selection means adapted for selecting, in accordance with input from the associated administrator, from which of the plurality of document processing operations the usage information is to be obtained. In a preferred embodiment, the selection means are further adapted for selecting, in accordance with input from the associated administrator, from which document processing environments the usage information is to be obtained.

In a preferred embodiment, the system also comprises storage means adapted for selectively storing the usage information. More preferably, the system comprises means adapted for acquiring timing data representative of a duration of time in which the usage information has been stored in the storage means and means adapted for deleting the usage information from the storage means upon a predetermined duration of time in which the usage information has been stored in the storage means.

Still further, in accordance with the present invention, there is provided a method for tracking feature usage in a document processing environment. The method comprises the steps of securing usage information relating to each of a plurality of document processing operations, which usage information is representative of at least one of frequency and duration and selectively communicating the usage information so as to be available to an associated administrator.

In a preferred embodiment, the method also includes receiving a monitor select signal and selectively enabling and disabling the monitoring means in accordance with the monitor select signal. Preferably, the method includes selectively resetting the usage information to a selected default value.

In yet another embodiment, the method comprises the steps of receiving the usage information, formatting the usage information into administration data in accordance with a predefined report structure, and communicating the administration data to the associated administrator. The administration data is preferably communicated to the to the associated administrator via at least one of an electronic mail message, an Internet web page, or a hard copy.

Preferably, the method also includes the step of selecting, in accordance with input from the associated administrator, from which of the plurality of document processing operations the usage information is to be obtained. In a more preferred embodiment, the document processing environments the usage information is to be obtained is also selected Preferably, the usage information is stored in a storage medium. More preferably, the method includes the steps of acquiring timing data representative of a duration of time in which the usage information has been stored in the storage means and deleting the usage information from the storage means upon a predetermined duration of time in which the usage information has been stored in the storage means.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENT

This invention is directed to a system and method for tracing and monitoring feature usage in a document processing environment. More particularly, this invention is directed to a system and method for tracking and monitoring the use of features, services, or functions available to users on document processing devices. The usage information is provided to an administrator or other authorized user in a format that is easily readable and usable.

Figure 1:
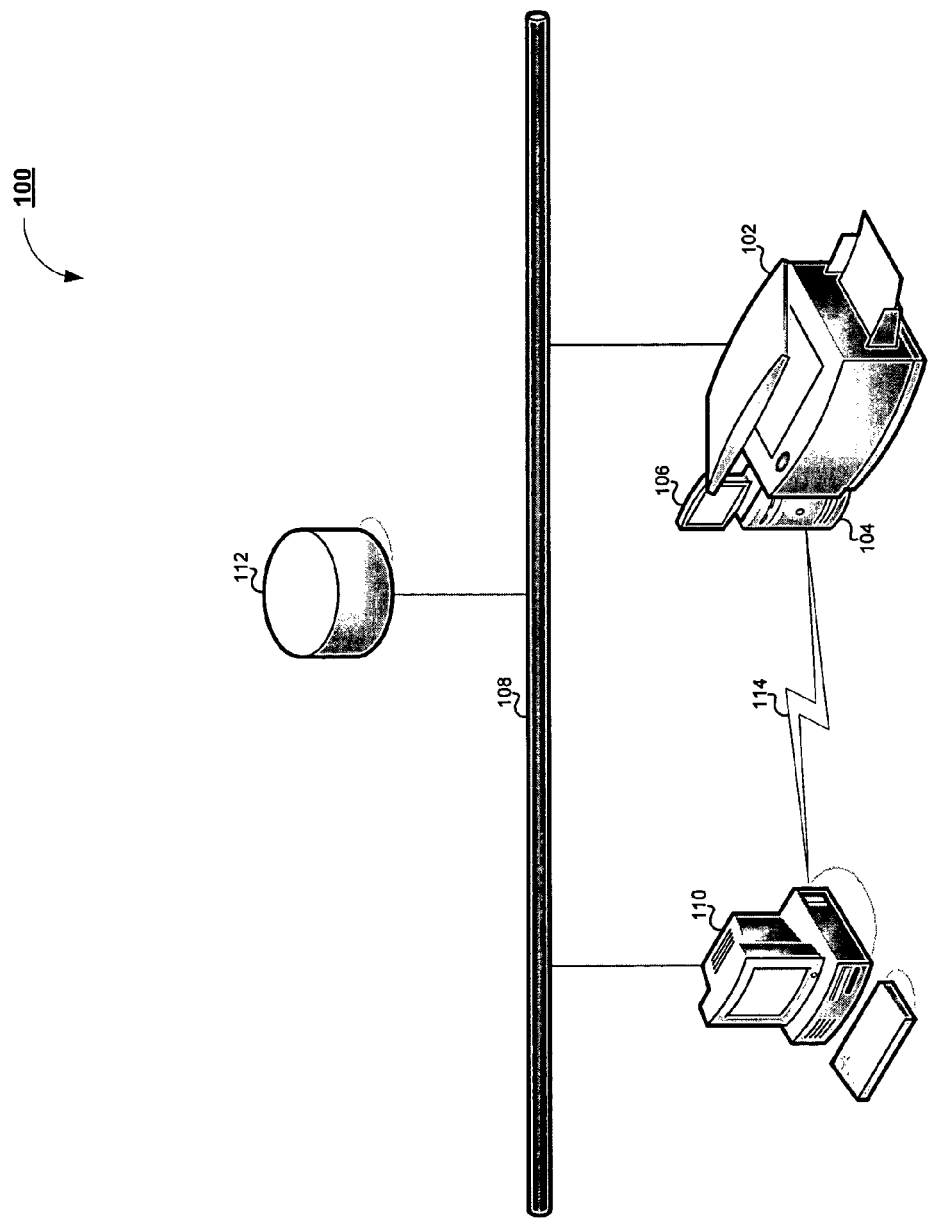
FIG. 1 is a block diagram illustrative of the system of the present invention.

FIG. 1 illustrates a block diagram preferred embodiment of the system according to the present invention generally designated as 100. The system comprises at least one document processing device, as illustrated by multifunction peripheral device 102, for generating or processing image data. It is to be appreciated that document processing device is any suitable document processing device known in the art, such as a copier, printer, scanner, facsimile and the like, or any combination thereof. Suitable commercially available document processing peripherals include, but are not limited to, the Toshiba e-Studio Series Controller.

The document processing 1 device 102 of the system 100 further comprises a controller 104, which controls the functions of the document processing device as will be appreciated by one of ordinary skill in the art. The controller 104 is capable of being externally or internally coupled to the multifunctional peripheral device 102. The controller 104 is advantageously any hardware, software, or combination thereof suitably capable of controlling the functioning of the document processing device 102 as will be appreciated by one of ordinary skill in the art. In one embodiment, the document processing includes an associated user interface 106. The user interface 106 suitably comprises a touch-screen or other input/output device capable of displaying and receiving user instructions for the operation of the multifunctional peripheral device 102.

The document processing device 102 is communicatively coupled to a computer network 108. The computer network includes an administrator computer or workstation 110. The computer network also includes a data storage device 112. The data storage device 112 is any mass data storage device known in the art, for example an integrated magnetic hard drive or other dynamic or static memory storage device.

In accordance with the present invention, an administrator at the administrator computer 110 enables the tracking function and selects the features to be tracked or monitored via any suitable means. Preferably, only an administrator or other authorized user has the ability to enable the tracking function and select the features to be tracked. Preferably, suitable security or password to prevent unauthorized access is used as is known by one skilled in the art. The administrator computer 110 communicates with the controller 104 of the document processing device 102 via a suitable communications link 114. As will be understood by those skilled in the art, the communications link 114 is any means for communication between two electronic devices, for example and without limitation, an Ethernet based network, infrared connection, Wi-Fi connection, Bluetooth connection and the like. The skilled artisan will appreciate that the communications link 114 is capable of being implemented over a computer network or by directly connecting the administrator computer 110 to the controller 104 of the multifunctional peripheral device 102. The administrator computer 110, using the communications link 114, uploads instructions for tracking usage information and receives such usage information from the document processing device. The usage information is then processed by the administrator computer via any suitable means. Preferably, a report is generated containing selected usage information and provided to the administrator in a suitable medium, such as an electronic mail message, via an Internet web page displayed on the administrator computer, or by a hard copy generated by an associated document processing device. Preferably, the usage information is stored in the data storage device. Preferably, the usage information is stored for a predetermined period of time. After such period of time has elapsed, the usage information is suitably deleted from the data storage device.

Figure 2:
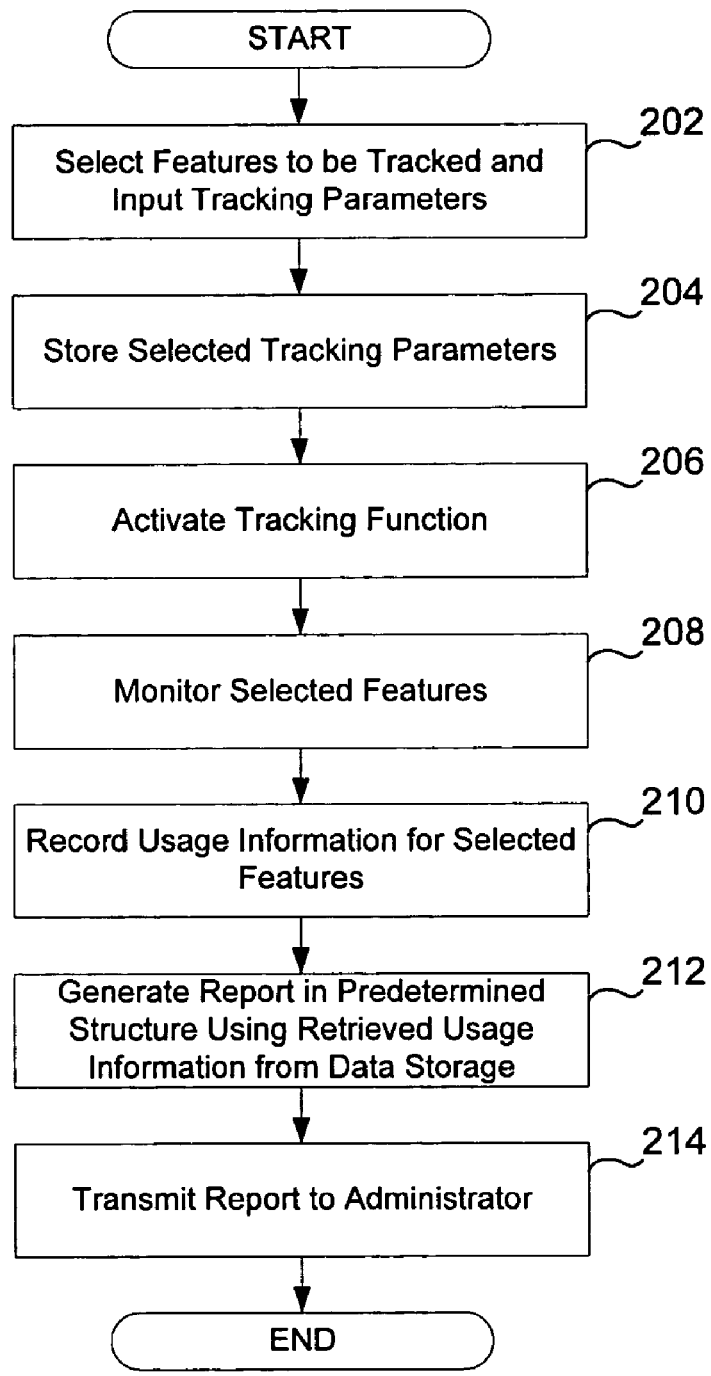
FIG. 2 is a flowchart illustrating the process according to the present invention.
Figure 3:
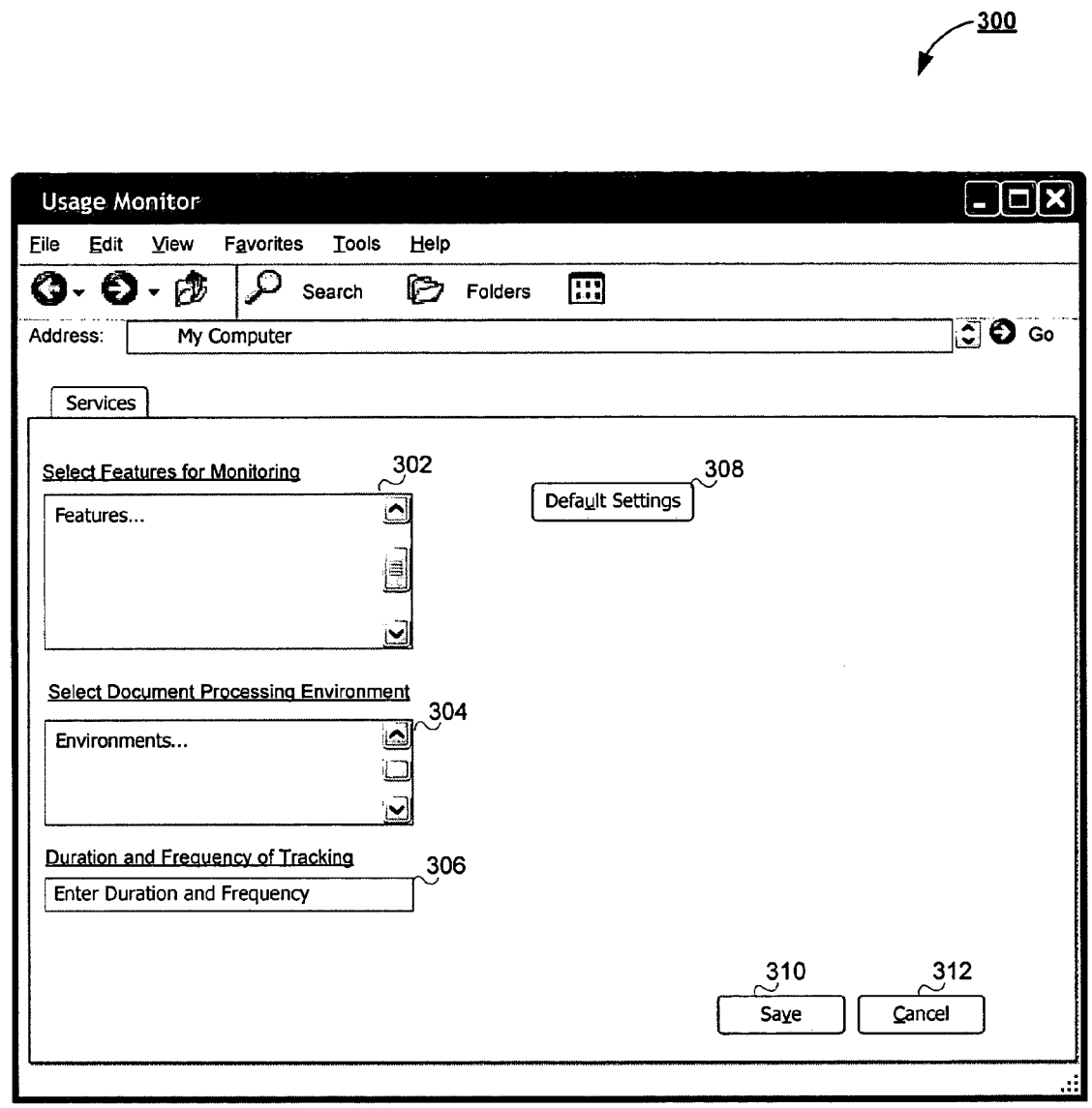
FIG. 3 is a sample template for selecting the parameters for monitoring the feature usage.

Referring now to FIG. 2, there is shown a flowchart illustrating the method according to the present invention. At 202, the administrator, via any suitable means, selects the features or services to be tracked or monitored and the parameters associated therewith. For example, the administrator selects the document processing operations or features to be tracked, the document processing environment to be tracked, such as the finance or engineering group, and the duration of such tracking. In one embodiment, the administrator has the ability to reset the usage information to a selected default value. Preferably, the administrator provides the parameters via a user interface associated with the administrator computer. FIG. 3 is a sample template 300 for selecting the tracking parameters. At 302, the administrator selects the features to be monitored. At 304, the administrator selects the document processing environment for monitoring. At 306, the administrator enters the duration and frequency of such tracking. In one embodiment, the administrator has the ability to reset the usage information to a default value. In enable this feature, the administrator selects the Reset to Default Value button 308. To save these selections, the administrator selects the Save button 310. If the administrator desires to cancel these selections, the administrator selects the Cancel button 312.

At 204, the selected tracking parameters are stored in the data storage device to be used once the tracking function is enabled. At 206, the administrator enables the tracking function via any suitable means. Preferably, the administrator enables the tracking function via the user interface associated with the administrator computer.

At 208, once the tracking function is enabled, the selected document processing operations or features are monitored as to the use of such features. The document processing operations or features are monitored for usage and the parameters of such use via any suitable means. At 210, the usage information for the selected operations and features is recorded via any suitable means and transmitted to the data storage device for storage.

At 212, selected usage information is retrieved from the data storage device and a report containing such information and in a predetermined structure is generated via any suitable means. Preferably, the usage information to be retrieved and the structure of the report is specified by the administrator via any suitable means and the retrieval of the usage information and the generation of the report are in accordance therewith. The administrator selects the usage information to be retrieved and the structure of the report via any suitable means. Preferably, the usage information contained in the report includes at least the type of document processing device, the feature monitored, the environment, and the period over which the information was tracked.

At 214, the generated report is suitably transmitted to the administrator. In one embodiment, the report is transmitted as an electronic mail message over the computer network. In another embodiment, the administrator views the report via an Internet web page displayed on display means accessible by the administrator. In one other embodiment, the report is transmitted to an associated document processing device and a hard copy of the report is generated.

Figure 4:
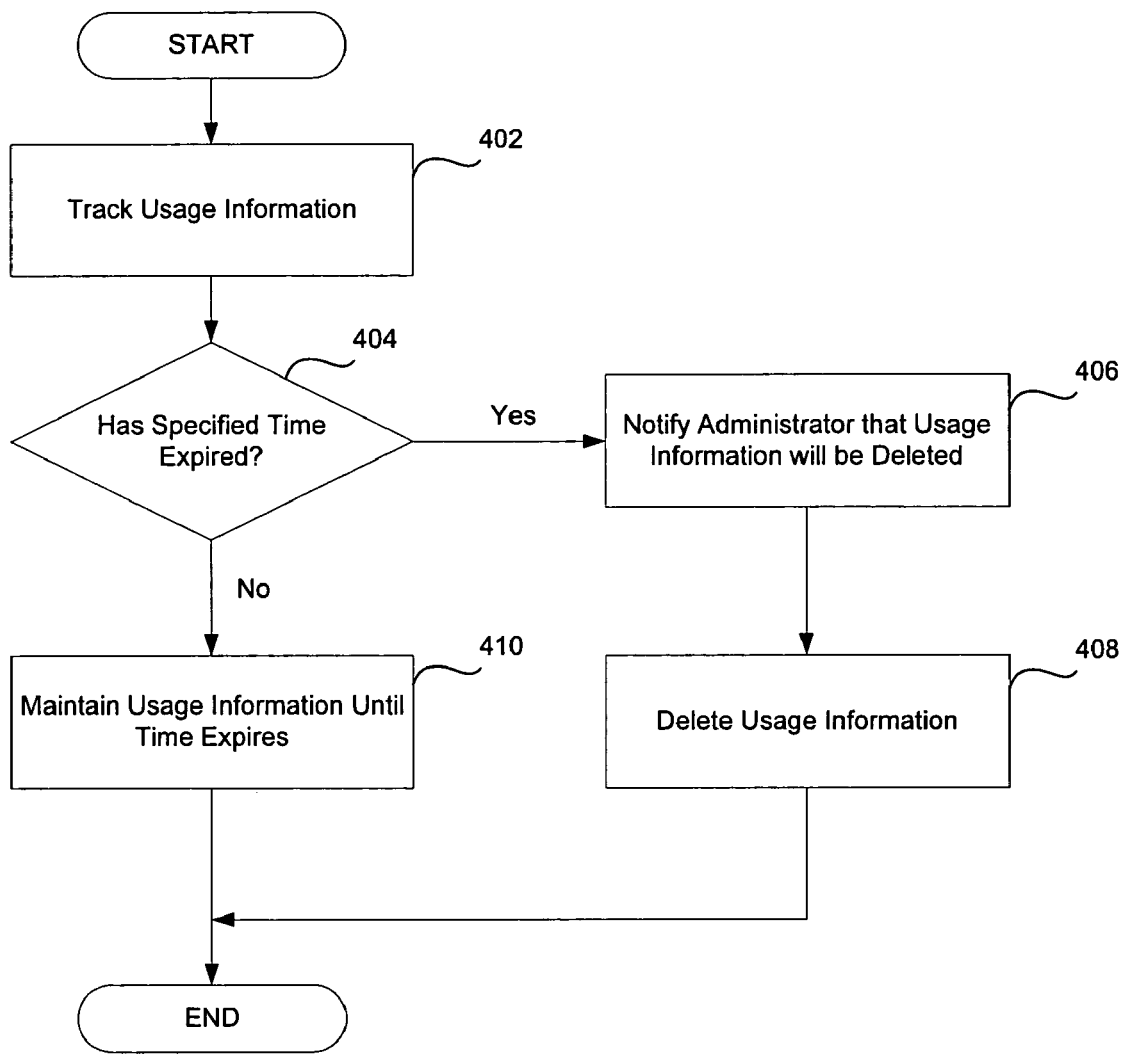
FIG. 4 is a flowchart illustrating one process of maintaining the usage information according to the present invention.

FIG. 4 is a flowchart illustrating one process of maintaining the usage information according to the present invention. At 402, the usage information is tracked as described above and transmitted to the data storage device. The usage information is stored in the data storage device for a predetermined time. Such time is suitably selected by the administrator via any suitable means. At 404, a determination is made whether the specified time has expired via any suitable means. If the time has expired, flow proceeds to 406, wherein the administrator is suitably notified that the usage information will be deleted. At 408, the usage information is deleted. In another embodiment, upon receipt of notification that the usage information will be deleted, the administrator has the ability to prevent the deletion of the usage information.

If the time has not expired, flow proceeds to 410, wherein the usage information is maintained until the specified time has expired.

Figure 5:
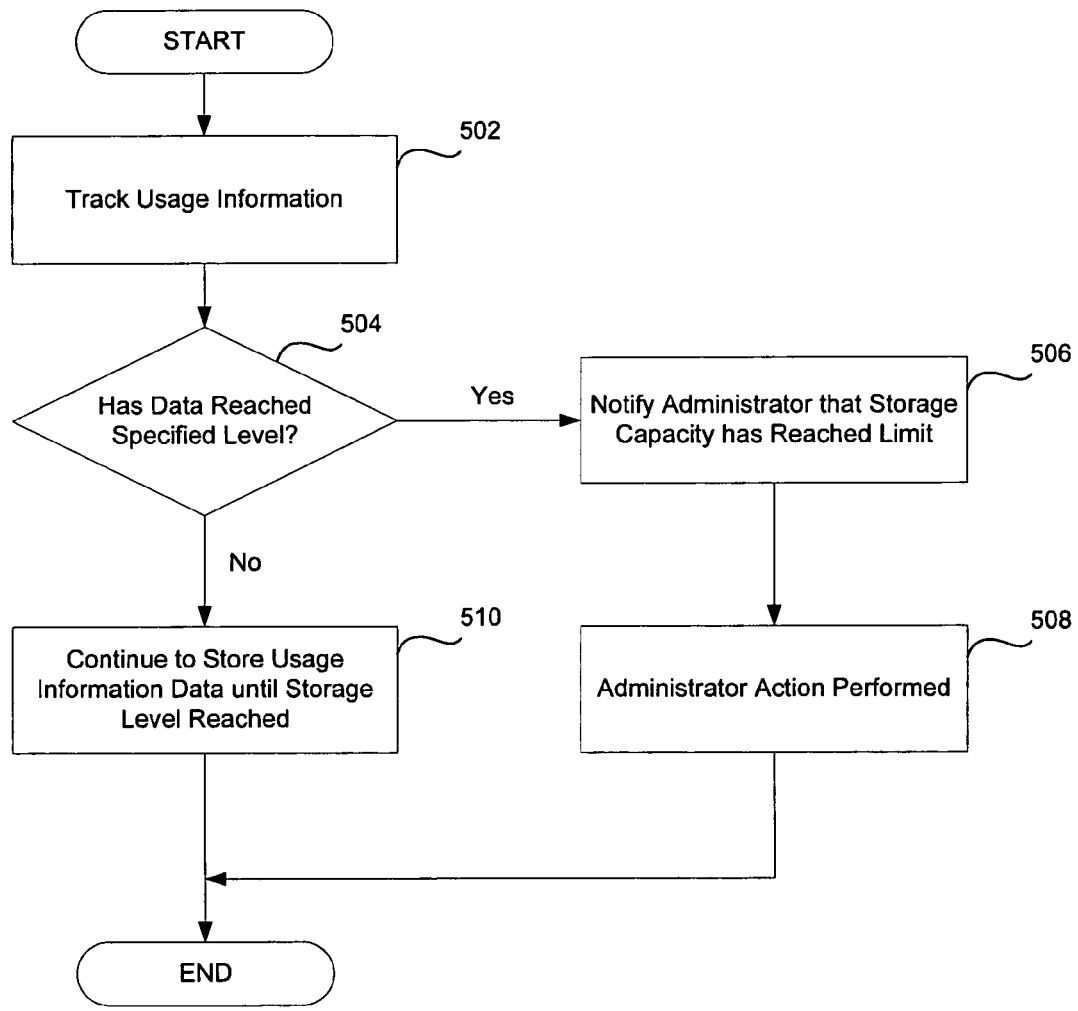
FIG. 5 is a flowchart illustrating another process of maintaining the usage information according to the present invention.

FIG. 5 is a flowchart illustrating another process of maintaining the usage information according to the present invention. At 502, the usage information is tracked as described above and transmitted to the data storage device. At 504, a determination is made via any suitable means whether the amount of usage information stored in the data storage device has reached a predetermined level. Such capacity level is preferably selected by the administrator via any suitable means, such as via a user interface associated with the administrator computer. If the amount of usage information stored in the data storage device has reached the predetermined level, a notification is transmitted to the administrator via suitable means as shown at 506. At 508, upon receipt of such notification, the administrator takes appropriate action to rectify the problem. For example, the administrator has the option to delete usage information no longer required, modify the predetermined level, or increase the data storage capacity of the system via any suitable means. If the amount of usage information stored in the data storage device has not reached the predetermined level, flow proceeds to 510, wherein usage information continues to be stored in the data storage device until the level is reached.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A system for tracking feature usage in a document processing environment comprising:
    a document processing device having a plurality of features, services, or functions;
    tracking means associated with tracking usage of each of the plurality of features, services, or functions of a document processing device;
    feature tracking parameter storage means adapted for storing a plurality of feature tracking parameters, each feature tracking parameter corresponding to a preselected document processing usage environment;
    means adapted for receiving, from an associated administrator, selection data corresponding to at least one of the feature tracking parameter;
    means adapted for receiving the selection data, via a data network, into an associated document processing device;
    monitoring means adapted for securing usage information with suitable security or password from each tracking means relating to each of a plurality of document processing operations specified by each feature tracking parameter corresponding to the selection data, which usage information is representative of at least one of frequency and duration;
    usage information storage means adapted for storing usage information;
    means adapted for selectively communicating the usage information via the data network so as to be available to the associated administrator; and
    means adapted for deleting at least a portion usage information from the usage information storage means in accordance with at least one of a capacity of the usage information storage means and passage of a preselected time.

2. The system for tracking feature usage in a document processing environment of claim 1, further comprising:
- means adapted for receiving a monitor select signal; and
- means adapted for selectively enabling and disabling the monitoring means in accordance with the monitor select signal.

3. The system for tracking feature usage in a document processing environment of claim 2, further comprising a report generator, the report generator including:
- means adapted for receiving the usage information;
- formatting means adapted for formatting the usage information into administration data in accordance with a predefined report structure; and
- means adapted for communicating the administration data to the associated administrator.

4. The system for tracking feature usage in a document processing environment of claim 3 further comprising reset means adapted for selectively resetting the usage information to a selected default value.

5. The system for tracking feature usage in a document processing environment of claim 3 further comprising means adapted for communicating the administration data to the associated administrator via at least one of an electronic mail message, an Internet web page, or a hard copy.

6. A computer-readable medium with computer-readable instructions stored thereon for tracking feature usage in a document processing environment comprising:
- instructions for tracking usage of each of a plurality of features, services, or functions of an associated document processing device;
- instructions for storing a plurality of feature tracking parameters, each feature tracking parameter corresponding to a preselected document processing usage environment;
- instructions for receiving, from an associated administrator, selection data corresponding to at least one of the feature tracking parameters;
- instructions for the receiving selection data, via a data network, into an associated document processing device;
- instructions for securing usage information for each of the plurality of features, services, or functions relating to each of a plurality of document processing operations specified by each feature tracking parameter corresponding to the selection data, which usage information is representative of at least one of frequency and duration;
- instructions for storing usage information in an associated storage;
- instructions for selectively communicating the usage information so as to be available to the associated administrator; and
- instructions for deleting at least a portion usage information from the storage in accordance with at least one of a capacity of the storage and passage of a preselected time.

7. The computer-readable medium with computer-readable instructions stored thereon for tracking feature usage in a document processing environment of claim 6, further comprising:
- instructions for receiving a monitor select signal; and
- instructions for selectively enabling and disabling the monitoring means in accordance with the monitor select signal.

8. The computer-readable medium with computer-readable instructions stored thereon for tracking feature usage in a document processing environment of claim 7, further comprising:
- instructions for receiving the usage information via a report generator;
- instructions for formatting the usage information into administration data in accordance with a predefined report structure; and
- instructions for communicating the administration data to the associated administrator.

9. The computer-readable medium with computer-readable instructions stored thereon for tracking feature usage in a document processing environment of claim 8 further comprising instructions for selectively resetting the usage information to a selected default value.

10. The computer-readable medium with computer-readable instructions stored thereon for tracking feature usage in a document processing environment of claim 8 further instructions for communicating the administration data to the associated administrator via at least one of an electronic mail message, an Internet web page, or a hard copy.

11. A computer-implemented method for tracking feature usage in a document processing environment comprising the steps of:
- tracking usage of each of a plurality of features, services, or functions of an associated document processing device;
- storing a plurality of feature tracking parameters, each feature trackin~ parameter corresponding to a preselected document processing usage environment;
- receiving, from an associated administrator, selection data corresponding to at least one of the feature tracking parameters: receiving the selection data, via a data network, into an associated document processing device;
- securing usage information for each of the plurality of features, services, or functions relating to each of a plurality of document processing operations specified by each feature tracking parameter corresponding to the selection data, which usage information is representative of at least one of frequency and duration;
- storing usage information in an associated storage;
- selectively communicating the usage information so as to be available to the associated administrator; and
- deleting at least a portion usage information from the storage in accordance with at least one of a capacity of the storage and passage of a preselected time.

12. The computer-implemented method for tracking feature usage in a document processing environment of claim 11, further comprising the steps of:
- receiving a monitor select signal; and
- selectively enabling and disabling the monitoring means in accordance with the monitor select signal.

13. The computer-implemented method for tracking feature usage in a document processing environment of claim 12, further comprising the steps of:
- receiving the usage information at an associated report generator;
- formatting the usage information into administration data in accordance with a predefined report structure; and
- communicating the administration data to the associated administrator.

14. The computer-implemented method for tracking feature usage in a document processing environment of claim 13 further comprising the step of selectively resetting the usage information to a selected default value.

15. The computer-implemented method for tracking feature usage in a document processing environment of claim 13 further comprising the step of communicating the administration data to the associated administrator via at least one of an electronic mail message, an Internet web page, or a hard copy.

* * * * *

UNITED STATES PATENT AND TRADEMARK OFFICE
CERTIFICATE OF CORRECTION

PATENT NO. : 7,661,142 B2
APPLICATION NO. : 10/995611
DATED : February 9, 2010
INVENTOR(S) : Brenda Daos and Vincent Wu It is certified that error appears in the above-identified patent and that said Letters Patent is hereby corrected as shown below:

In Claim 1, Column 6, Line 63, please replace "means adapted for deleting at least a portion usage infor-" with --means adapted for deleting at least a port of the usage infor- --.

In Claim 6, Column 7, Line 53, please replace "instructions for deleting at least a portion usage informa-" with --instructions for deleting at least a portion of the usage informa- --.

In Claim 10, Column 8, Line 14, please replace "instructions for communicating the administration data to the" with --comprising instructions for communicating the administration data to the--.

In Claim 11, Column 8, Line 23, please replace "feature trackin~ parameter corresponding to a prese-" with --feature tracking parameter corresponding to a prese- --.

In Claim 11, Column 8, Line 27, please replace "parameters: receiving the selection data, via a data net-" with --parameters;
receiving the selection data, via a data net- --.

In Claim 11, Column 8, Line 38, please replace "deleting at least a portion usage information from the stor-" with --deleting at least a portion of the usage information from the stor- --.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO.       : 7,661,142 B2                                    Page 1 of 1
APPLICATION NO.  : 10/995611
DATED            : February 9, 2010
INVENTOR(S)      : Daos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 915 days.

Signed and Sealed this

Twenty-eighth Day of December, 2010

David J. Kappos
*Director of the United States Patent and Trademark Office*